US006601305B1

(12) United States Patent
Fukuoka

(10) Patent No.: US 6,601,305 B1
(45) Date of Patent: Aug. 5, 2003

(54) CIRCULAR SAWS HAVING BLADE ANGLE ADJUSTING MECHANISMS

(75) Inventor: Toru Fukuoka, Anjo (JP)

(73) Assignee: Makita Corporation, Anjo (JP)

( * ) Notice: Subject to any disclaimer, the term of this patent is extended or adjusted under 35 U.S.C. 154(b) by 209 days.

(21) Appl. No.: 09/637,906

(22) Filed: Aug. 14, 2000

(30) Foreign Application Priority Data

Aug. 16, 1999 (JP) .......................................... 11-229929

(51) Int. Cl.[7] ............................ B27B 5/70; B27B 9/02; B23D 45/14

(52) U.S. Cl. .............................. 30/376; 30/388; 30/390

(58) Field of Search .......................... 30/376, 374, 375, 30/388, 390, 391, 293, 320; 83/473, 471.3, 529

(56) References Cited

U.S. PATENT DOCUMENTS 3,292,673 A * 12/1966 Gregory ...................... 30/377
4,870,758 A * 10/1989 Fushiya ....................... 30/388
4,999,916 A 3/1991 Sistare
5,010,651 A * 4/1991 Techter et al. ................ 303/76
5,433,008 A 7/1995 Barger, Jr. et al.
5,452,515 A * 9/1995 Schilling ..................... 30/376
6,202,311 B1 * 3/2001 Nickels, Jr. .................. 30/376
6,474,207 B1 * 11/2002 Itzov ......................... 83/471.3
2001/0037578 A1 11/2001 Mori et al.

FOREIGN PATENT DOCUMENTS

DE 2641666 4/1977
DE 4300033 7/1994
DE 4403186 8/1995
DE 19523348 1/1996

* cited by examiner

*Primary Examiner*—Boyer D. Ashley
(74) *Attorney, Agent, or Firm*—Dennison, Schultz & Dougherty

(57) ABSTRACT

A portable circular saw includes a base and a saw unit having a circular saw blade. The saw unit is coupled to the base, so that the saw unit can laterally incline relative to the base. The saw unit can be fixed in a lateral inclining position relative to the base by a tightening device. A stopper device can define a maximum lateral inclining angle of the saw unit and includes a stopper and an engaging mechanism for engaging the stopper. The stopper can move with the saw unit. The engaging mechanism is adapted to engage the stopper when the saw unit is in a first maximum inclined position and when the saw unit is in a second maximum inclined position that is greater than the first maximum inclined position.

21 Claims, 15 Drawing Sheets

CIRCULAR SAWS HAVING BLADE ANGLE ADJUSTING MECHANISMS

BACKGROUND OF THE INVENTION

1. Field of the Invention

The present invention relates to portable circular saws, and in particular to portable circular saws that have a saw unit inclining mechanism for laterally inclining a saw unit with respect to a workpiece. In particular, portable circular saws can perform bevel-cutting operations using a saw blade that is laterally inclined relative to a base that contacts a workpiece.

2. Description of the Related Art

Known portable circular saws comprise a base adapted to contact a workpiece, and a saw unit that has a circular saw blade. The saw blade has a lower portion that can protrude downward through and from the base so as to cut the workpiece. The circular saw unit can vertically pivot relative to the base (in a direction perpendicular to the rotational axis of the saw blade), so that the downward protruding distance of the saw blade from the base can be changed. Thus, the cutting depth can be adjusted. In addition, the circular saw can laterally pivot relative to the base (in a lateral direction with respect to the saw blade), so that a bevel cutting operation can be performed with the saw blade laterally inclined relative to the workpiece. The incline angle of the saw blade can also be adjusted.

In general, the lateral pivotal position of the saw unit can be adjusted between a 0° position and a 45° position. In the 0° position, the saw blade extends perpendicular to the base or the workpiece, so that a normal cutting operation can be performed. In the 45° position, the saw blade is inclined at an angle of 45° relative to the base or the workpiece. This 45° position is most frequently selected when a laterally inclined (bevel) cutting operation is performed. This position is referred to as a "standard inclined position" in this description. A stopper device serves to prevent the saw unit from pivoting from the 0° position to a position less than 0° and also from pivoting from the 45° position to a position more than 45°. Therefore, the operator can easily and reliably position the saw unit at either the 0° position or the 45° position.

U.S. Pat. Nos. 5,433,008 and 4,999,916 teach portable circular saws that have a stopper device to stop the inclination of the saw unit selectively at the standard inclined position and an extra inclined position, which may be an inclination angle of more than 45°.

FIG. 6 of U.S. Pat. No. 5,433,008 has been incorporated into the drawings of this application as FIG. 17. As shown in FIG. 17, a lateral inclining device 100 comprises an upright guide plate 102 that is secured to a base 101. An arc-shaped slot 103 is formed in the guide plate 102. A saw unit (not shown in FIG. 17) can pivot about a pivot shaft 105 and has a lock screw 104 that is inserted into the arc-shaped slot 103 and that can move along the arc-shaped slot 103. A stopper screw 107 is mounted on the guide plate 102 at one end of the arc-shaped slot 103 and opposes the lock screw 104. A disk member is rotatably mounted on the lock screw 104 and has legs 106 positioned on both sides of the lock screw 104.

In order to prevent the saw unit from pivoting more than an inclined angle 45° (i.e., the standard inclined position), the disc is rotated to a position in which one of the legs 106 opposes the stopper screw 107. The operator pivots the saw unit, so that one of the legs 106 contacts the stopper screw 107 when the saw unit reaches the 45° position. The operator thereafter tightens the lock screw 104, so that the saw unit can be fixed in position at the 45° position.

In order to fix the saw unit at an extra inclined position that is past the 45° position, the operator rotates the disk member by an angle of 90° while the stopper screw 107 is disposed within an enlarged end portion 103*a* of the slot 103, so that the lock screw 104 directly opposes the stopper screw 107. As a result, the saw unit can be stopped at the extra inclined position as shown in FIG. 17, in which the lock screw 104 directly contacts the stopper screw 107.

FIG. 3 of U.S. Pat. No. 4,999,916 has been incorporated into the drawings of this application as FIG. 18. As shown in FIG. 18, a lateral inclining device 120 comprises an upright guide plate 124 that is secured to a base 121. A saw unit 123 can laterally pivot relative to the base 121 about a pivotal shaft 122. A bracket plate 125 also can pivot about the pivotal shaft 122.

A first guide slot 126 is formed in the guide plate 124 and extends along an arc about the pivotal shaft 122. A second guide slot 128 having a greater curvature than the first guide slot 128 is connected to the upper end of the first guide slot 126 via an L-shaped part 127.

The bracket plate 125 is mounted on the saw unit 123 and has an L-shaped slot 125*a*. A lock screw 129 is secured to the saw unit 123 and is inserted into the L-shaped slot 125*a* and the first guide slot at 127 (or the second guide slot 128).

In order to prevent the saw unit 123 from pivoting past an inclined angle of 45° (i.e., the standard inclined position), the lock screw 129 is positioned on the left side within the L-shaped slot 125*a*. Therefore, the lock screw 129 can contact the upper end of the first guide slot 126. The saw unit 123 then can be fixed in the 45° position by tightening the lock screw 129.

In order to stop the saw unit at an extra inclined position past the 45° position, the operator shifts the lock screw 129 rightward within the L-shaped slot 125*a* with the lock screw 129 positioned at the upper end of the first guide slot 126 of the guide plate 124. As a result, the lock screw 129 moves into the second slot 128 via the L-shaped part 127. Therefore, the saw unit 123 can be stopped at the extra inclined position when the lock screw 129 contacts the upper end of the second slot 128.

However, in both the above U.S. patents, in order to change the stop position of the saw unit from the 45° inclined position to the extra inclined position that is more than 45°, or from the extra inclined position to the 45° inclined position, the operator must perform a cumbersome operation.

For example, in U.S. Pat. No. 5,433,008, in order to change the stop position, the disc must be rotated to change the position of the legs 106 with the stopper screw 104 positioned within the enlarged end portion 103*a* of the guide slot 103. Thus, the pivotal movement of the saw unit must be first stopped at about the 45° inclined position and then the disc must be rotated to further pivotally move the saw unit.

In U.S. Pat. No. 4,999,916, in order to change the stop position, the lock screw 129 must be shifted from the first guide recess 126 to the second guide recess 128 or from the second guide recess 128 to the first guide recess 126 with the lock screw 129 positioned at about the upper end of the first guide recess 126, in which the saw unit 123 is inclined at an angle of about 45°.

SUMMARY OF THE INVENTION

It is, accordingly, one object of the present invention to teach portable circular saw having improved stopper devices, which can simplify the operation of changing the stop position.

In one aspect of the present teachings, portable circular saws are taught that can smoothly move from an inclined position less than 45° to an inclined position more than 45° without interruption or special operations. Thus, the saw unit can freely pivot through the 45° position, when desired by the operator. However, the saw unit can also stop at the 45° position when desired by the operator. Therefore, such portable circular saws are particularly convenient to use.

In another aspect of the present teachings, circular saws may have an engaging mechanism mounted on the base and adapted to engage a stopper that can move with a saw unit. The engaging mechanism can engage the stopper when the saw unit is in a first maximum inclined position (e.g., 45°) and when the saw unit is in a second maximum inclined position (e.g., 50°) that is greater in the incline angle than the first inclined position. Therefore, the operator can adjust the maximum inclined position without operating a mechanism associated with a lock screw, such as a disk member mounted on the lock screw, and without shifting the lock screw. As a result, the operator can smoothly incline the saw unit from an inclined position that is less than the first maximum inclined position, such as 45°, to the second maximum inclined position, such as 50°, via the first maximum inclined position without interruption of the inclining movement at the first maximum inclined position.

Other objects, features and advantages of the present invention will be readily understood after reading the following detailed description together with the accompanying drawings and the claims.

DETAILED DESCRIPTION OF THE INVENTION

Figure 1:
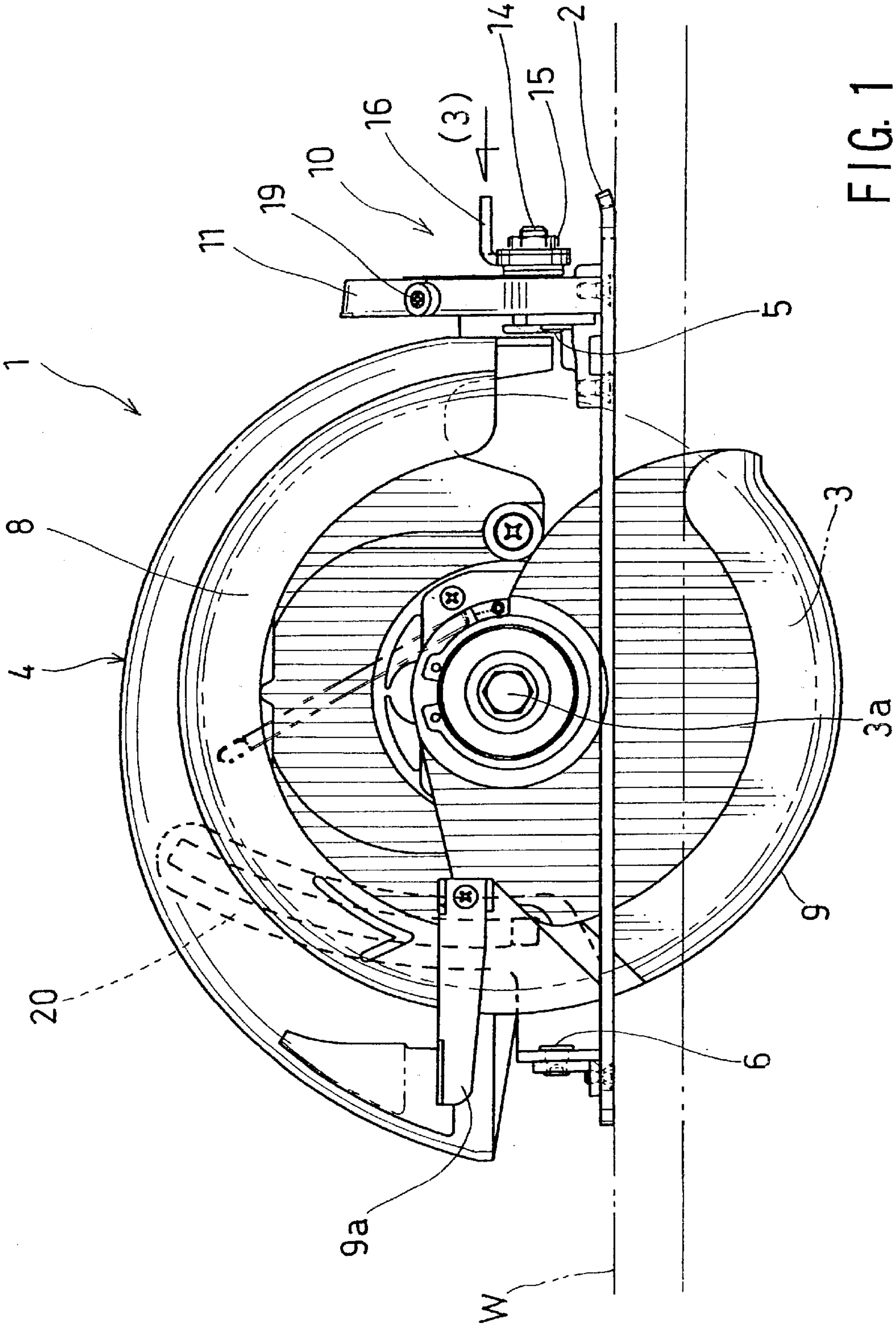
FIG. 1 is a side view of a first representative circular saw having an improved laterally inclining device with a stopper to determine a maximum inclined position of a saw unit.

Portable circular saws arc taught that may have a base and a saw unit. The saw unit may include a circular saw blade coupled to the base, so that the saw unit can laterally incline relative to the base. A tightening device may serve to fix the saw unit relative to the base in a lateral inclining position. A stopper device can limit the maximum lateral inclining angle of the saw unit and may include a stopper and an engaging mechanism. Preferably, the stopper can move with the saw unit. The engaging mechanism may be mounted, for example, on the base and may engage the stopper when the saw unit is in a first maximum inclined position and when the saw unit is in a second maximum inclined position that is greater in an inclined angle than the first inclined position.

Therefore, the operator can easily change the maximum inclined position from the first maximum inclined position to the second maximum inclined position by the operation of the engaging mechanism. In that case, the engaging mechanism will not engage the stopper at the first maximum inclined position.

As a result, the operator can smoothly incline the saw unit from an inclined position that is less than the first maximum inclined position, such as 45°, to the second maximum inclined position, such as 50°, via the first maximum inclined position without interruption of the inclining movement at the first maximum inclined position.

In a first representative embodiment, the engaging mechanism may include an engaging member that can move between a first position and a second position for setting the first maximum inclined position and the second maximum inclined position, respectively. Preferably, the engaging member opposes the stopper in the inclining direction of the saw unit at least when the engaging member is in the first position.

Preferably, the saw unit can laterally incline about a pivotal axis, and the engaging member may comprise a pin that can rotate about an axis substantially parallel to the pivotal axis of the saw unit. The pin may include a first engaging surface and a second engaging surface spaced from the first engaging surface in a circumferential direction. Preferably, the first engaging surface opposes the stopper when the pin is in the first position and the second engaging surface opposes the stopper when the pin is in the second position.

Preferably, the circular saw further includes a retainer that serves to retain the pin in either the first position or the second position. In addition, a dial may be mounted on the pin, so that the operator can rotate the dial in order to shift the pin between the first position and the second position.

In a second representative embodiment, the stopper may comprise a first stopper and a second stopper. The engaging mechanism may comprise a first engaging member and a second engaging member, which respectively engage the first stopper and the second stopper when the saw unit is in the first maximum inclined position and the second maximum inclined position, respectively. The first engaging member may move between a first position opposing the first stopper and a second position in which the first engaging member does not oppose the first stopper so as to permit the saw unit to move from the first maximum inclined position to the second maximum inclined position.

The tightening device may include a lock screw and a lock nut for engaging the lock screw. The lock screw may be fixed in position in the inclining direction of the saw unit. A guide plate may be mounted on the base and may have a guide slot to provide a guide for the lock screw in the inclining direction of the saw unit. The lock screw may serve as the second engaging member, and one end of the guide slot may serve as the second stopper.

Preferably, the saw unit can laterally incline about a pivotal axis, and the first engaging member can shift between the first position and the second position in a direction substantially parallel to the pivotal axis of the saw unit.

In a third representative embodiment, the first engaging member can shift between the first position and the second position within a plane that is substantially perpendicular the pivotal axis of the saw unit.

In the second and third representative embodiments, the circular saw may include a spring that can bias the first engaging member toward the first position.

Each of the additional features and method steps disclosed above and below may be utilized separately or in conjunction with other features and method steps to provide improved circular saws and methods for designing and using such circular saws. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention.

Figure 2:
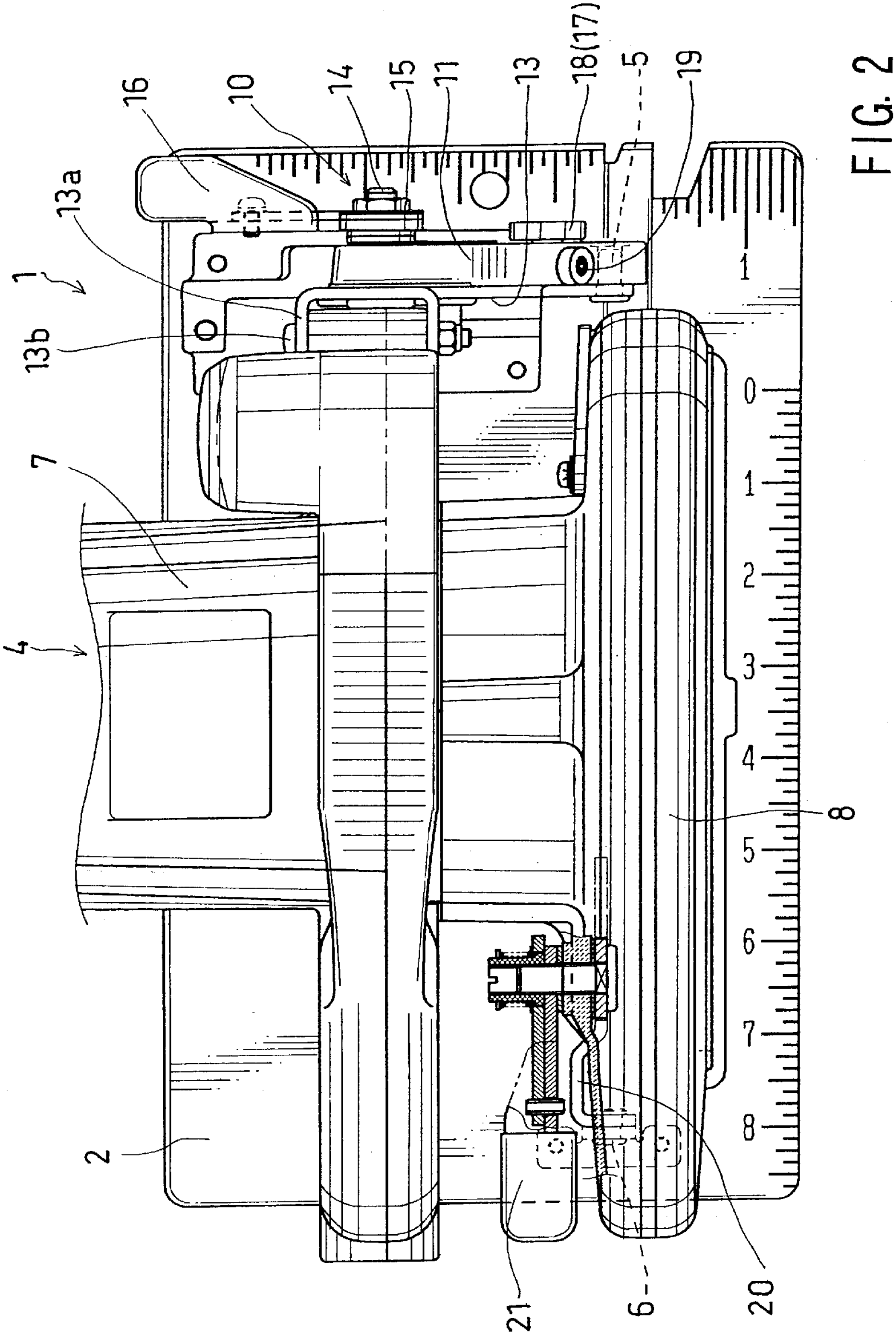
FIG. 2 is a plan view of the first representative circular saw.

A first representative embodiment of a portable circular saw will now be described with reference to FIGS. 1 to 8. FIGS. 1 and 2 illustrate a portable circular saw 1 that may comprise a base 2 and a saw unit 4. The base 2 is preferably adapted to contact a workpiece W during a cutting operation. The saw unit 4 may have a rotary circular saw blade 3. A laterally inclining device 10 may comprise pivotal supports 5, 6 that are mounted on the base 2 on the front side and the rear side of the saw unit 4, respectively, so as to laterally pivotally support the saw unit 4.

The saw unit 4 may include a motor 7 that drives the saw blade 3. A blade case 8 may substantially cover an upper half of the saw blade 3. A safety cover 9 may serve to cover the exposed lower half of the saw blade 3 and can move to uncover the saw blade 3 as the front end of the safety cover 3 contacts workpiece W during the cutting operation, which may be performed by moving the circular saw 1 rightward as viewed in FIG. 1. Thus, the safety cover 9 can rotate relative to the saw unit 4 about a pivotal axis 3*a* that coincides with the rotational axis of the saw blade 3. Further, the lower half of the saw blade 3 can be exposed to the outside while the safety cover 9 rotates in a clockwise direction as viewed in FIG. 1, which figure shows the safety cover 9 in a fully closed position. A lever 9*a* may be attached to the safety cover 9 to permit the operator to manually open and close the safety cover 9.

The laterally inclining device 10 will now be further described. The laterally inclining device 10 may include an upright guide plate 11 that is secured to an upper surface of the base 2. The front pivotal support 5 may comprise a support pin mounted on the guide plate 11. A guide slot 12 may be formed in the guide plate 11 and may have an arc-shaped configuration about the pivotal support 5 (and the pivotal support 6) that is a lateral pivotal axis of the saw unit 4. The guide slot 12 may have a substantially uniform width in the lengthwise direction.

Figure 8:
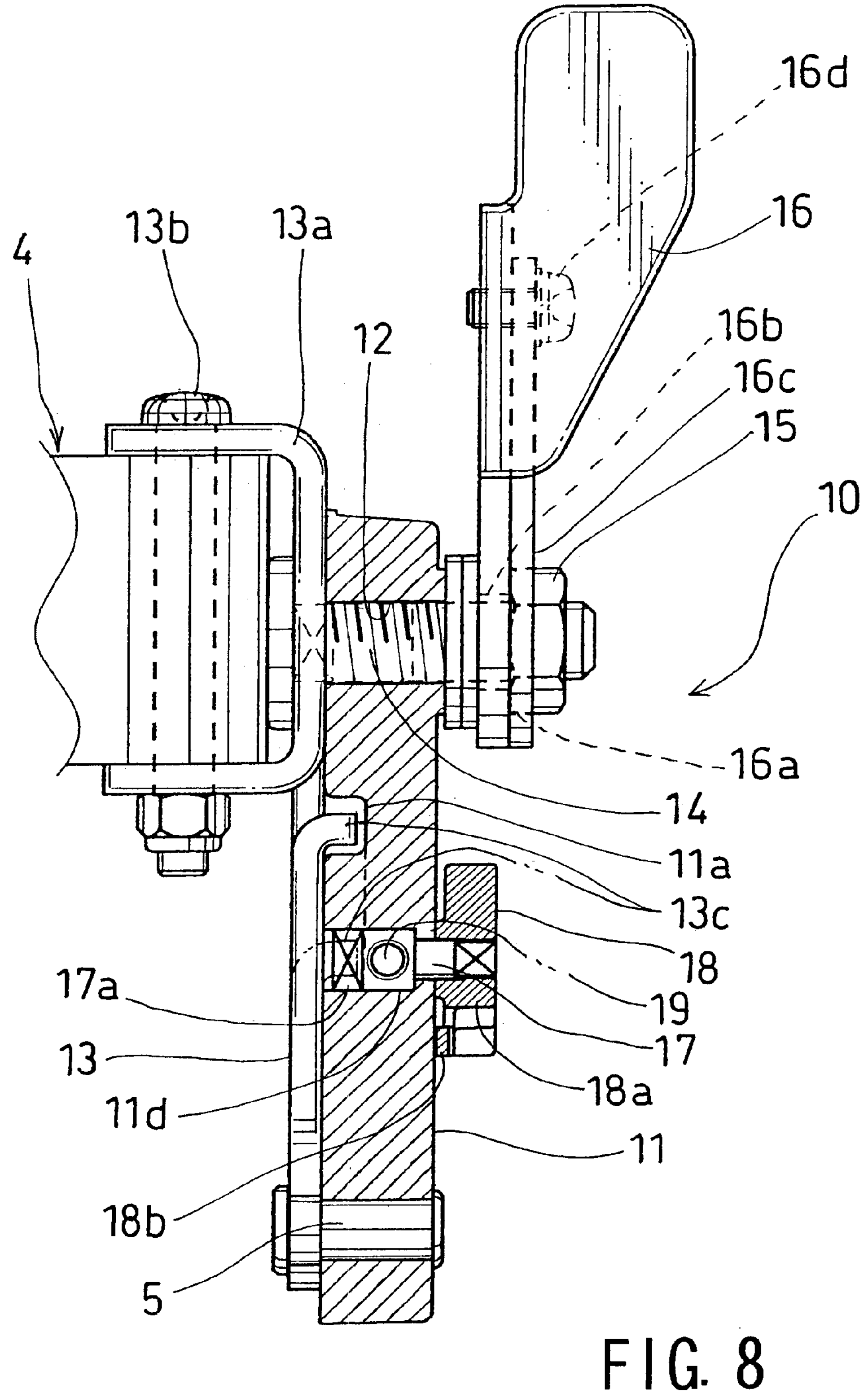
FIG. 8 is a horizontal sectional view of a guide plate with several associated parts of the first representative circular saw.

As shown in FIG. 8, a joint plate 13 may be disposed on the rear side of the guide plate 11 and may be vertically pivotally mounted on the pivotal support 5. The saw unit 4 may be vertically pivotally supported by the joint plate 13 by means of a support shaft 13*b* that is mounted on a U-shaped bracket 13*a*. The bracket 13*a* may be formed on one end of the joint plate 13 opposite to the pivotal support 5. As a result, the vertical position of the saw blade 3 relative to the base 2 can be changed. That is, the amount of the saw blade 3 that downwardly extends from the base 2 can be changed to vary the cutting depth into the workpiece W.

The rear side of the saw unit 4 may be laterally pivotally supported by the rear pivotal support 6 by means of a depth guide 20 that can laterally pivot about the pivotal support 6. The depth guide 20 may serve to guide the rear portion of the saw unit 4 during the pivotal movement of the saw unit 4 about the support pin 13*b*. A lock lever 21 shown in FIG. 2 may be operable by the operator to fix the vertical pivotal position of the saw unit 4.

A lock screw 14 may be secured to the front surface of the joint plate 13 and may extend forward toward the guide plate 11 so as to be inserted into the guide slot 12. A hexagonal lock nut 15 may engage the lock screw 14 and can be tightened to fix the joint plate 13 in position relative to the guide plate 11. As a result, the lateral pivoted position of the saw unit 4 can be fixed by tightening the lock screw 14.

Figure 3:
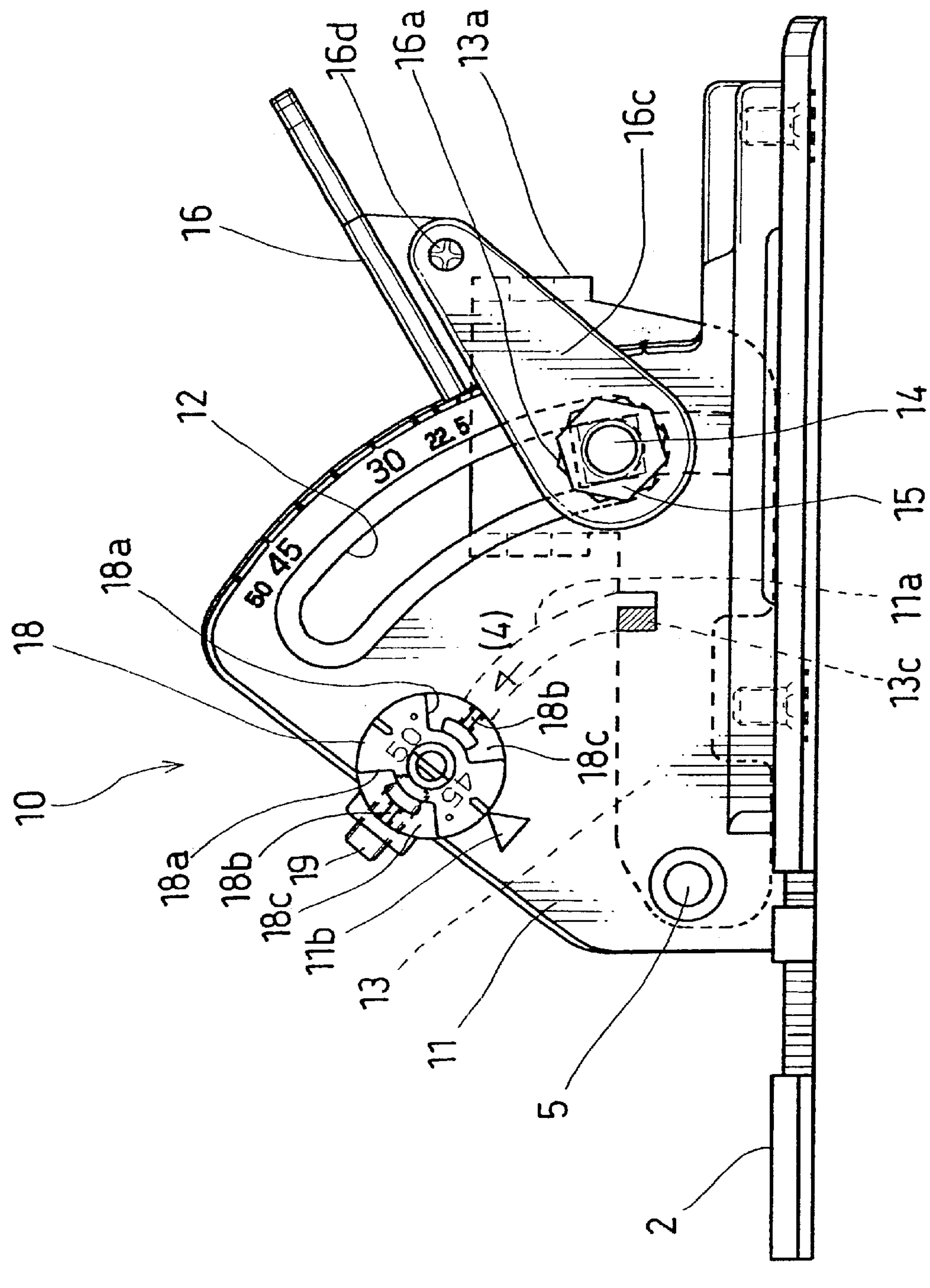
FIG. 3 is a side view of the laterally inclining device of the first representative circular saw as view in the direction of arrow (3) in FIG. 1 and showing the operation for fixing the saw unit in a 0° position (i.e., a vertical position.

As shown in FIGS. 3 and 8, a lock lever 16 may be mounted on the lock nut 15 by means of an auxiliary plate 16*c*. A circular insertion hole 16*b* may be formed on one end of the lock lever 16 and may rotatably receive a shank of the lock screw 14. Therefore, the lock lever 16 itself may be free to pivot relative to the lock screw 14. A dodecagonal hole 16*a* may be formed in one end of the auxiliary plate 16*c* and the hexagonal head of the lock nut 15 may engage the dodecagonal hole 16*a*. The other end of the auxiliary plate 16*c* may be secured to the respective end of the lock lever 16 by means of a screw 16*d*. As a result, when the operator rotates the lock lever 16, the rotational force is transmitted to the lock nut 15 via the screw 16*d* and the auxiliary plate 16*c*, so that the lock nut 15 can be tightened or loosened against the lock screw 14.

When the screw 16*d* has been removed or loosened, the auxiliary plate 16*c* can be removed from the lock lever 16, so that the lock lever 16 is free to pivot relative to the lock screw 14. Therefore, the operator can suitably adjust the final position of the lock lever 16 relative to the lock screw when the lock nut 15 has been completely tightened.

As the operator pivots the lock lever 16 to loosen the hexagonal lock nut 15 and then pivots the saw unit 4, the joint plate 13 can pivot with the saw unit 4. As a result, the lock screw 14 moves along the guide slot 12. Preferably, the length of the guide slot 12 is determined such that saw unit 4 can move between a 0° inclined position and a maximum inclined position. In the 0° inclined position, the operator can perform a normal cutting operation of the workpiece W with the saw blade 3 positioned at a right angle relative to the base 2 or the workpiece W. The maximum inclined position may be a 50° inclined position, in which the saw blade 3 is inclined at an angle of 50° relative to the base 2 or the workpiece W.

Figure 6:
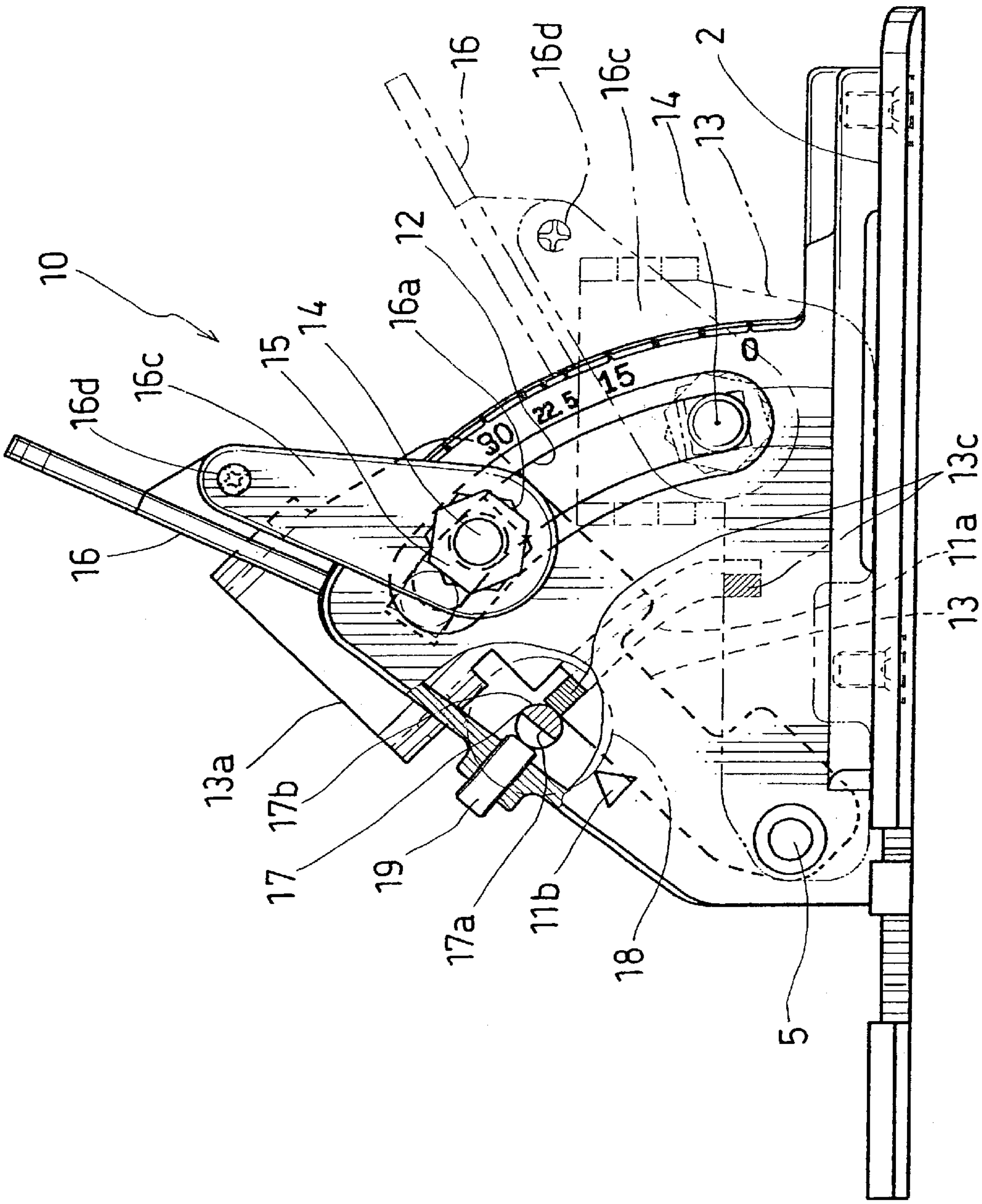
FIG. 6 is a side view similar to FIG. 3, but instead, showing the operation for fixing the saw unit in a 45° position.
Figure 7:
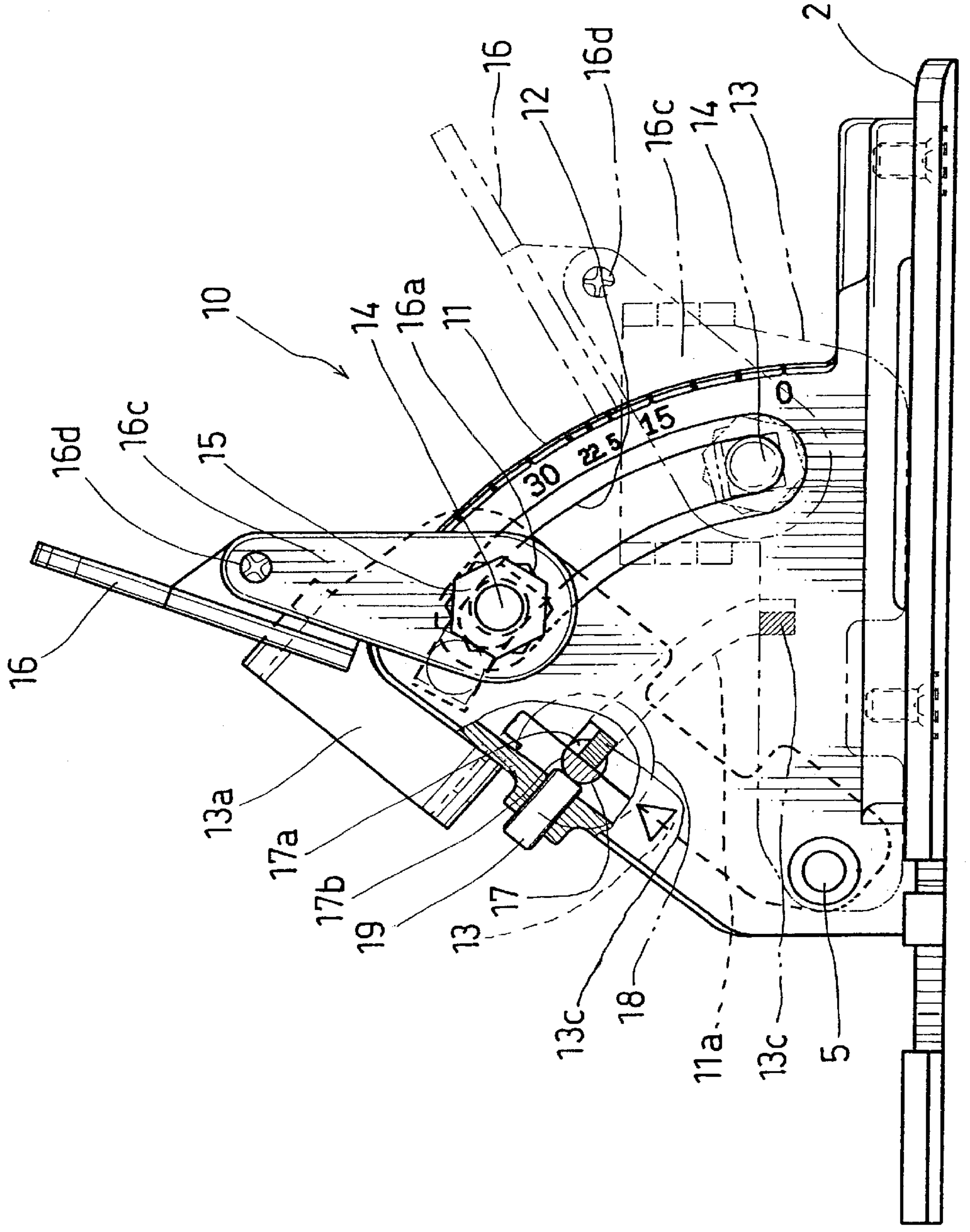
FIG. 7 is a side view similar to FIG. 3, but instead, showing the operation for fixing the saw unit in a 50° position.

FIG. 3 shows a front view of the circular saw when the saw unit 4 is in the 0° inclined position and FIG. 7 shows a front view of the circular saw when the saw unit 4 is in the maximum inclined position. FIG. 6 also shows the front view of the circular saw 1 when the saw unit 4 is in a standard inclined position, which may be a 45° inclined position.

A stopper projection 13*c* may be formed with the joint plate 13 by cutting and bending a part of the joint plate 13. An arc-shaped recess 11*a* may be formed in the rear surface of the guide plate 11 for receiving the joint plate 13 so as to prevent any interference between the projection 13*c* and the guide plate 11.

An engaging member or a pin 17 may be mounted on the guide plate 11 and may serve to limit the pivoting range of the joint plate 13 or the maximum stroke end of the lock screw 14. Preferably, the pin 17 is rotatably supported by the guide plate 11 and has one end positioned within an insertion hole 11*d* (see FIG. 5) formed in the rear side of the guide plate 11. The insertion hole 11*d* may have an elongated configuration to permit fine adjustment of the position of the rear end pin 17 in the diametrical direction, which will be explained below in further detail. The insertion hole 11*d* may open into the recess 11*a*, so that the projection 13*c* of the joint plate 13 opposes the rear end of the pin 17 in the moving direction of the projection 13*c*. A switching dial 18 may be secured to the front end of the pin 17 that extends forward from the guide plate 11.

As shown in FIG. 3, angle identifications "45°" and "50°" may be marked on the front surface of the switching dial 18 and may be positioned such that they diametrically oppose each other. Further, an arrow 11*b* may be marked on the front surface of the guide plate 11 so as to indicate the selected angle of either "45°" or "50" If the arrow 11*b* points to the identification "45°", the saw unit 4 can be pivoted to the maximum angle of 45° (i.e., the standard maximum inclined position). If the arrow 11*b* points to the identification "50°", the saw unit 4 may be pivoted to the maximum angle of 50° (i.e., the extra maximum inclined position).

Preferably, stepped portions 18*a* may be formed on the front surface of the switching dial 18 in positions displaced from the angle identifications. The stepped portions 18*a* may oppose each other in the diametrical direction. Therefore, the operator can easily rotate the switching dial 18 by grasping the stepped portions 18*a* and rotating the dial 18.

Figure 4:
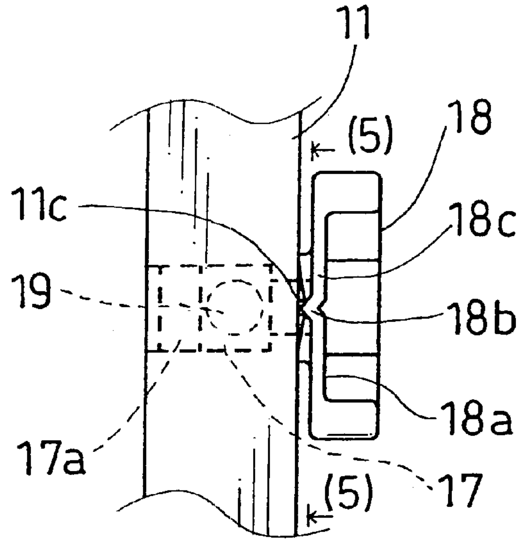
FIG. 4 shows a view of a switching dial as viewed in the direction of arrow (4) in FIG. 3.
Figure 5:
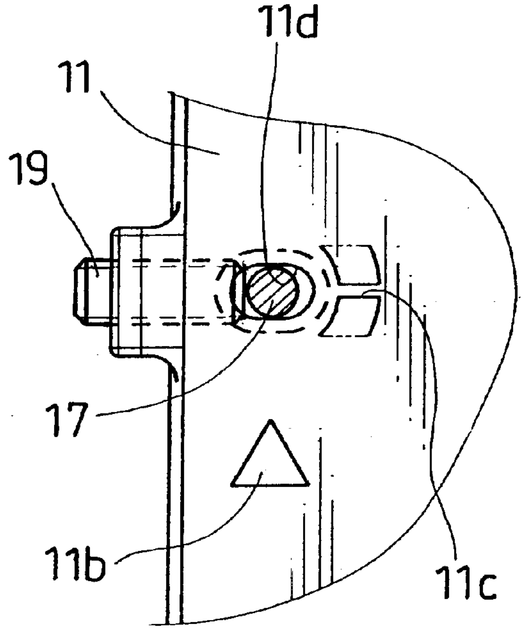
FIG. 5 is a sectional view taken along line (5)—(5) in FIG. 4.

The stepped portions 18*a* may each have a bottom 18*c*, which bottom 18*c* may be thin to provide appropriate resiliency. As shown in FIG. 4, angular protrusions 18*b* may be formed on the rear surface of the bottoms 18*c*. As shown in FIG. 5, an engaging recess 11*c* may be formed on the front surface of the guide plate 11 and may serve to engage either one of the angular protrusions 18*b*. Therefore, when the switching dial 18 has been rotated to the "45°" position, in which the arrow 11*b* points to the identification "45°", or has been rotated to the "50" position, in which the arrow 11*b* points the identification "50", the corresponding angular protrusion 18*b* may automatically and resiliently engage the engaging recess 11*c*, so that the switching dial 18 can be held in position. Therefore, the switching operation of the switching dial 18 can be easily and reliably performed.

Preferably, the rear end of the pin 17 may have a semi-circular cut-out recess 17*a*, so that the remaining part 17*b* may have a semi-circular section. Therefore, when the switching dial 18 has been rotated to the "45°" position, the remaining semi-circular part 17*b* may oppose the projection 13*c* of the joint plate 13. On the other hand, when the switching dial 18 has been rotated to the "50°" position, the cut-out recess 17*a* may oppose the projection 13*c*.

As shown in FIG. 5, an adjusting screw 19 may engage the guide plate 11 in a direction perpendicular to the longitudinal direction of the pin 17. The adjusting screw 19 may have one end that contacts a substantially central portion of the pin 17. Therefore, the position of the rear end of the pin 17 in the diametrical direction may vary within the elongated insertion hole 11*d* in response to pressure applied by the adjusting screw 19 or in response to the depth of the adjusting screw 19 that has been driven into the hole 11*d*. Thus, this first representative embodiment permits precise adjustment to the 45° inclined position or the 50° inclined position.

A representative method for operating the above first representative embodiment will now be described.

In order to fix the lateral inclined position of the saw unit 4, the operator pivots the lock lever 16 to tighten the lock screw 14, while the saw unit 4 is held in a desired inclined position, which may include the 0° inclined position or the 45° inclined position or any other desired positions. As a result, the joint plate 13 and the saw unit 4 connected to the joint plate 13 can be fixed in position relative to the guide plate 11 with respect to the laterally inclined position. Therefore, the operator can perform a cutting operation while the saw unit 4 is fixed in the desired laterally pivoted position. For example, the operator can perform a normal vertical cutting operation of the workpiece W while the saw unit 4 is held in the 0° inclined position. Alternatively, the operator can perform an inclined (bevel) cutting operation while the saw unit is held in the 45° inclined position.

In order to change the laterally inclined position of the saw unit 4 with respect to the base 2, the operator may pivot the lock lever 16 in the opposite direction in order to loosen the lock screw 14, so that the joint plate 13 is free to rotate about the pivotal support 5. In this state, the operator can laterally pivot the saw unit 4 to the desired inclined position. As the operator pivots the saw unit 4, the joint plate 13 pivots with the saw unit 4. Therefore, the lock screw 14 will move along the guide recess 12.

The operator can select the maximum inclined position of the saw unit 4, i.e. either the 45° inclined position or the 50° inclined position, by rotating the switching dial 18.

In order to set the maximum inclined position to the 45° inclined position, the operator rotates the switching dial 18 to a first position, in which the identification "45°" is aligned with the arrow 11*b*. As a result, the arc of the semi-circular portion 17*b* of the pin 17 opposes the engaging portion 13*c* of the joint plate 13. Therefore, when the operator pivots the saw unit 4 to the 45° inclined position, the engaging portion 13*c* contacts the center of the arc of the semi-circular portion 17*b*, so that the saw unit 4 cannot pivot further to increase the pivoted angle.

In order to set the maximum inclined position to the 50° inclined position, the operator rotates the switching dial 18 to a second position, in which the identification 50° is aligned with the arrow 11*b*. As a result, the cut-out recess 17*a* of the pin 17 opposes the engaging portion 13*c* of the joint plate 13. Therefore, when the operator pivots the saw unit 4 to the 50° inclined position, the engaging portion 13*c* contacts the chord of the semi-circular portion 17*b* as shown in FIG. 7, so that the saw unit 4 cannot pivot further to increase the pivoted angle. However, the saw unit 4 can pivot past the 45° inclined position by an angle of 5°. Thus, the difference in contacting positions against the engaging portion 13*c* between the center of the arc and the chord of the semi-circular portion 17*b* may be chosen to correspond to an angle of 5°.

In particular, in this representative embodiment, with the switching dial 18 set to the second position for the 50° inclined position, the operator can smoothly pivot the saw unit 4 from a position that is less than 45° to the 50° inclined position via the 45° inclined position or from the 50° inclined position to the position that is less than 45° via the 45° inclined position. Thus, the saw unit 4 can smoothly move through the 45° inclined position without interruption and without any special operation. Therefore, the first representative embodiment does not require cumbersome operations, which are required for known circular saws, such as stopping the inclining operation at the 45° inclined position and mechanically adjusting the inclining mechanism before pivoting the saw unit to an angle greater than 45°. Consequently, a special operation is not required to permit the saw unit to pivot past the 45° inclined position.

For both maximum inclined positions of 45° and 50°, the operator can precisely adjust the inclined angle by varying the driving amount of the adjusting screw 19.

In addition, the guide slot 12 may simply have a longitudinal length that corresponds to the settable inclined range of 0° to 50°. Because an enlarged portion as in U.S. Pat. No. 5,433,008 is not required, the lock screw 14 may not cause backlash in the widthwise direction of the guide slot 12.

The above first representative embodiment can be modified in various ways. For example, the adjusting screw 19 may be omitted. In such a case, the insertion hole 11*d* may have a circular configuration, instead of the elongated configuration.

In addition, although the engaging member (e.g., pin) 17 rotates to change the maximum inclined angle in the first representative embodiment, an axially movable engaging member may instead be used to change the maximum inclined angle. A second representative embodiment that incorporates such an axially movable engaging member will now be described with reference to FIGS. 9 to 12. In the second representative embodiment, like elements are given the same reference numerals as the first representative embodiment.

Figure 11:
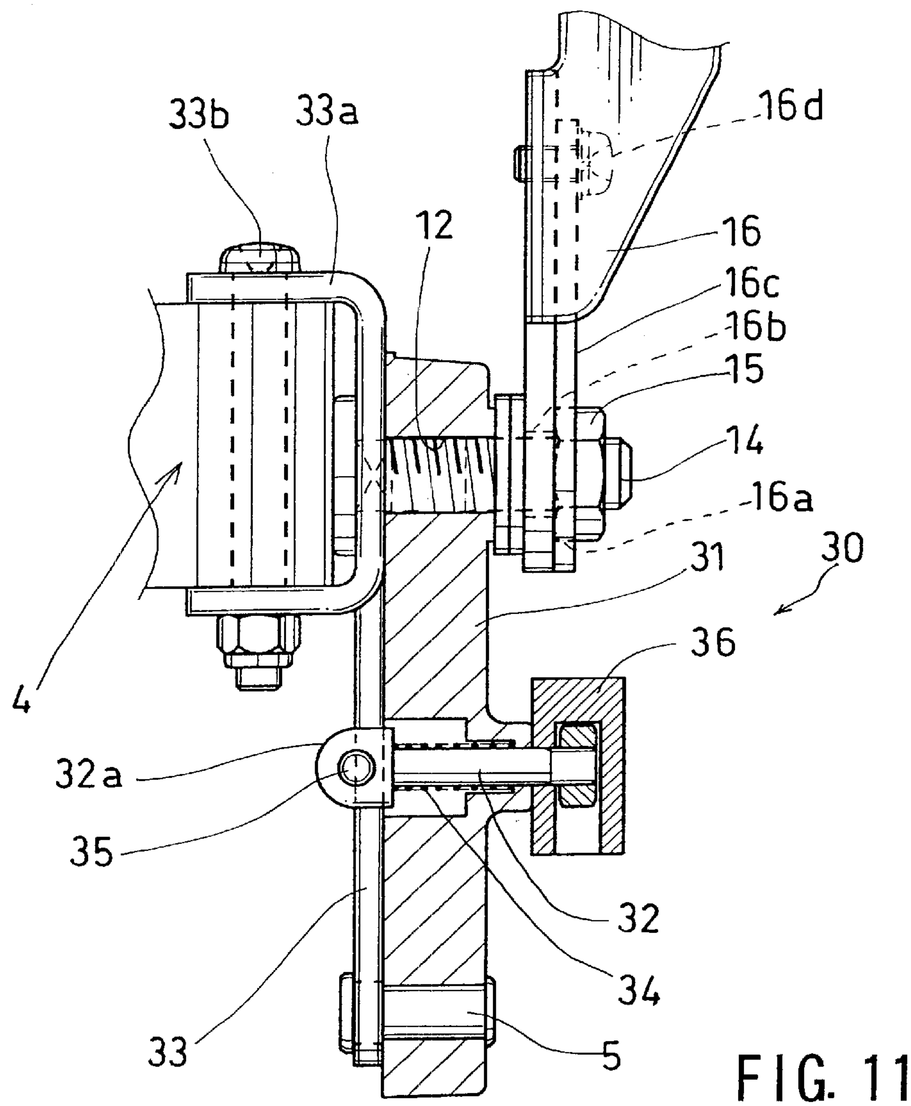
FIG. 11 is a horizontal sectional view of a guide plate with several associated parts of the second representative circular saw.

The lateral inclining device 30 of the second representative embodiment may differ from the lateral inclining, device 10 of the first representative embodiment in the mechanism for changing the maximum inclined angle. As shown in FIG. 11, a guide plate 31 may have an engaging member (e.g., a pin) 32 that can slide relative to the guide plate 31 in an axial direction that is parallel to the pivotal support 5 or the lateral pivotal axis of the saw unit 4.

Similar to the first representative embodiment, a joint plate 33 may be disposed on the rear side of the guide plate 31 and may vertically pivot relative to the guide plate 31 by means of the pivotal support 5. However, the guide plate 31 does not have a projection 13*c* as in the first representative embodiment. In the same manner as the first representative embodiment, the saw unit 4 may be vertically pivotally supported by the joint plate 33 by means of a support shaft 33*b* that is mounted on a U-shaped bracket 33*a*. The bracket 33*a* may be disposed on one end of the joint plate 33 opposite to the pivotal support 5.

Figure 12:
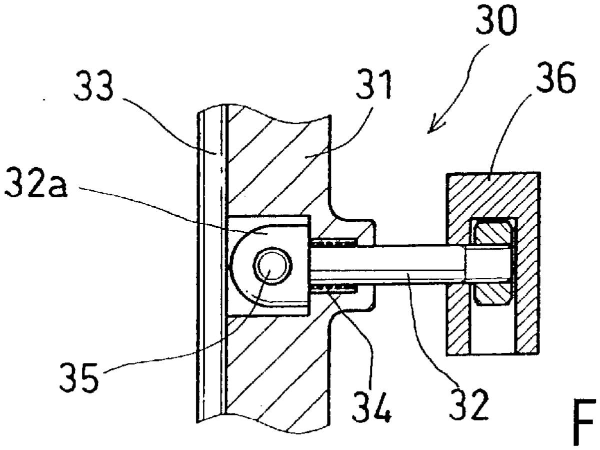
FIG. 12 is a view of a stopper pin in a retracted position.
Figure 13:
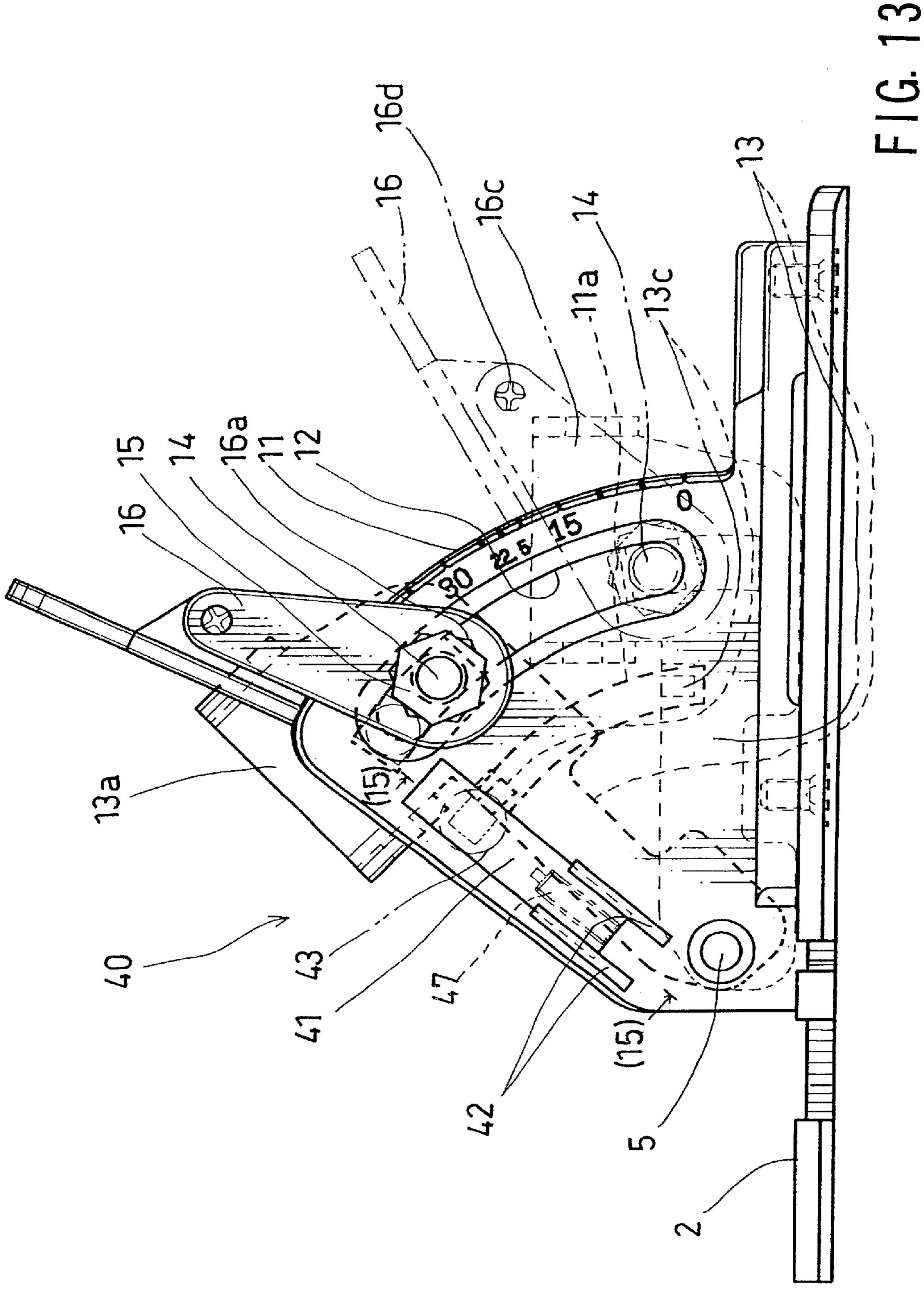
FIG. 13 is a side view of a laterally inclining device of a third representative circular saw and showing the operation for fixing the saw unit in a 45° position.
Figure 14:
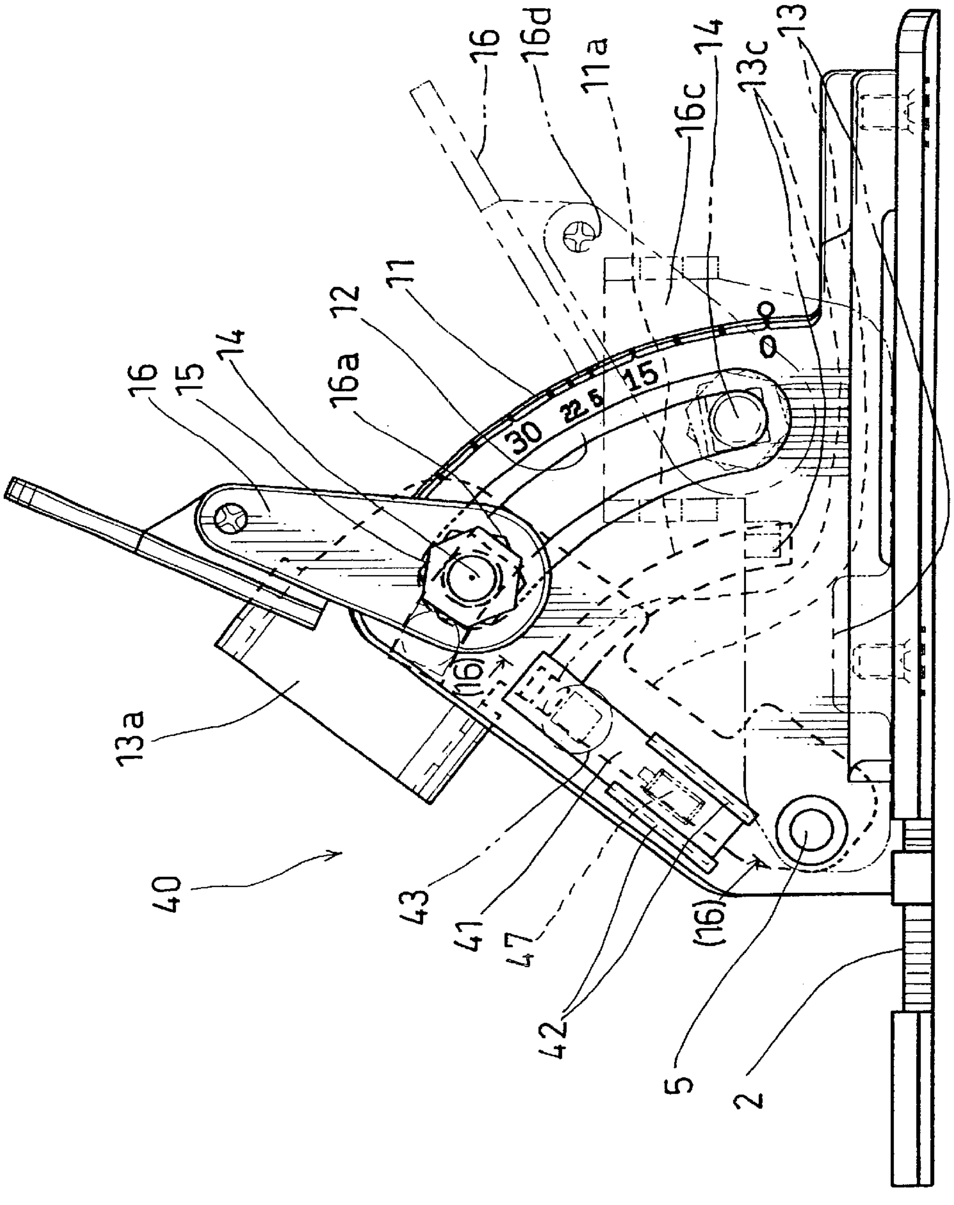
FIG. 14 is a side view similar to FIG. 13, but instead, showing the operation for fixing the saw unit in a 50° position.
Figure 15:
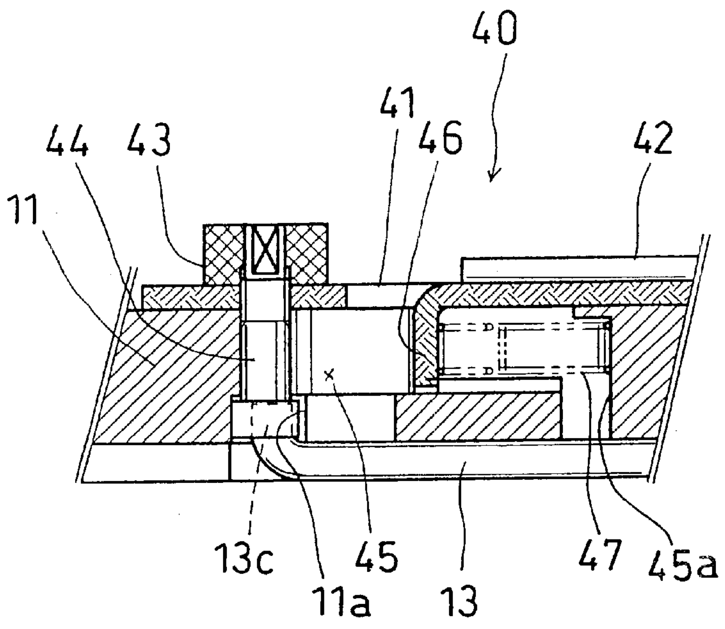
FIG. 15 is a sectional view taken along line (15)—(15) in FIG. 13.

Preferably, a compression spring 34 may bias the pin 32 in the rearward direction or a leftward direction as viewed in FIGS. 11 and 12 to an extended position, in which the rear end of the pin 32 opposes the upper edge of the joint plate 33 in the vertical direction. A support plate 32*a* may be mounted on the rear end of the pin 32. An adjusting screw 35 may engage and may extend through the support plate 32*a* in a direction perpendicular to the longitudinal direction of the pin 32, so that the lower end of the adjusting screw 35 can oppose the upper edge of the joint plate 33 when the pin 32 is in the extended position.

Figure 10:
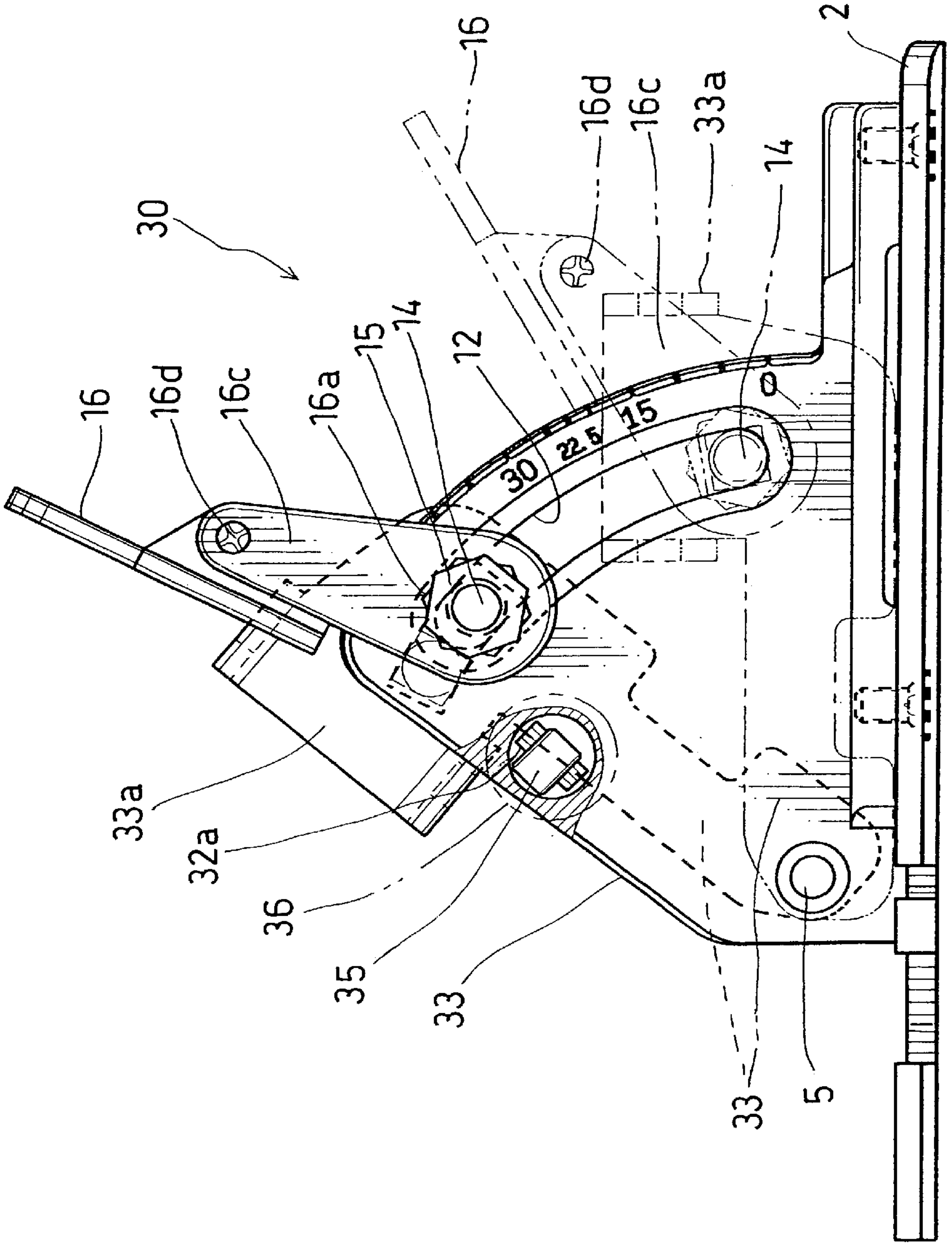
FIG. 10 is a side view similar to FIG. 9, but instead, showing the operation for fixing the saw unit in a 50° position.

A knob 36 may be secured to the front end of the pin 32 that extends forward of the front surface of the guide plate 31. Therefore, the operator can grasp the knob 36 in order to axially shift the pin 32 from the extended position to a retracted position, as shown in FIGS. 10 and 12, against the biasing force of the spring 34. In the retracted position, the adjusting screw 35 may not oppose the upper edge of the joint plate 33.

Figure 9:
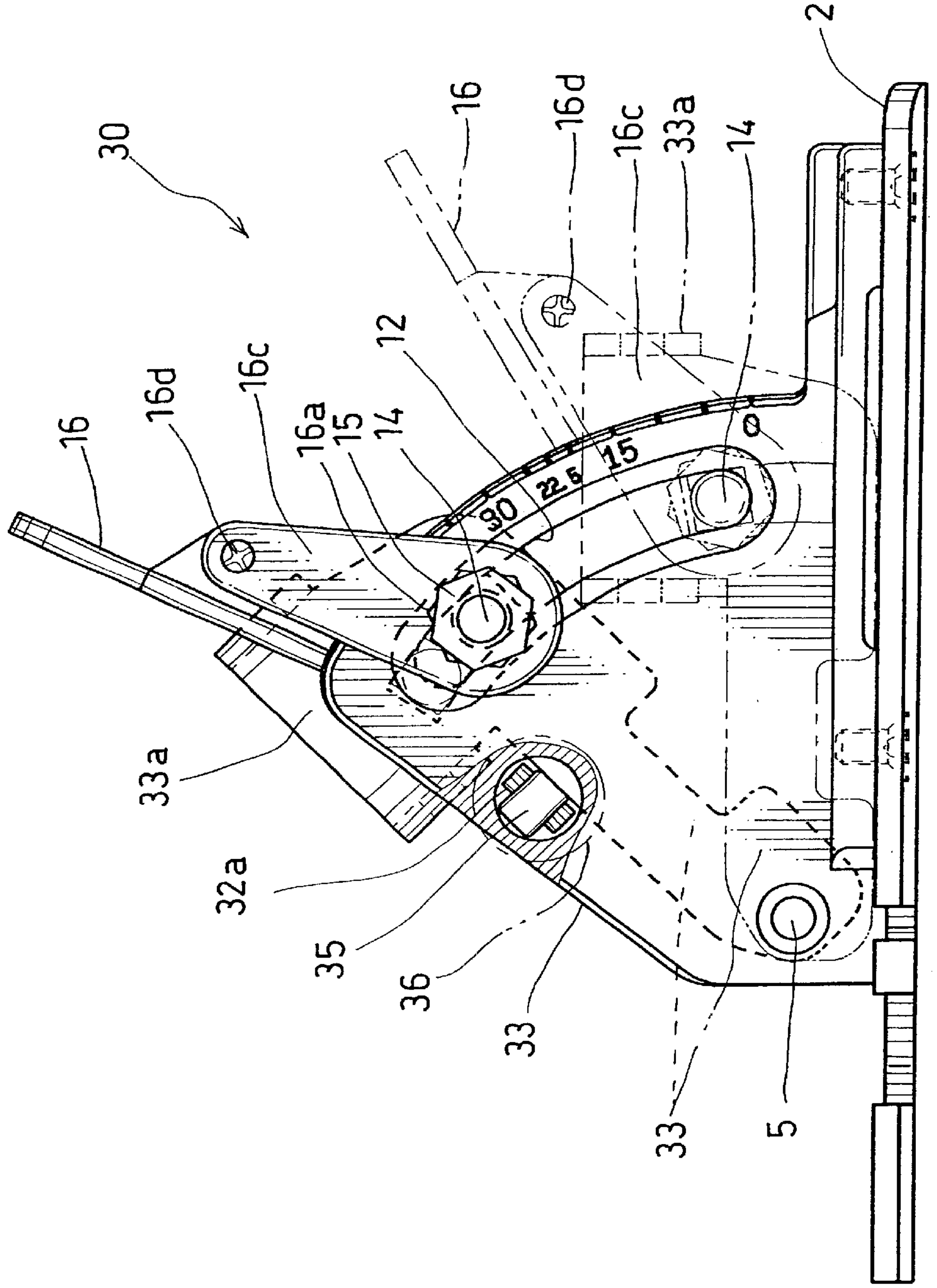
FIG. 9 is a side view of a laterally inclining device of a second representative circular saw and showing the operation for fixing the saw unit in a 45° position.

When the knob 36 is not pulled by the operator, the pin 32 is disposed in the extended position as a result of the biasing force of the spring 34. In the extended position, the pin 32 can contact the adjusting screw 35 to prevent further pivotal movement of the joint plate 33 or the saw unit 4 when the saw unit has been pivoted up to 45°, as shown in FIG. 9.

In order to pivot the saw unit 4 past 45°, the operator may pull the knob 36 to the retracted position against the biasing force of the spring 34. As a result, the saw unit 4 can pivot past 45°. When the saw unit 4 has been pivoted to the desired inclined angle, the operator may tighten the lock lever 16, so that the saw unit can be fixed in the desired inclined position in the same manner as the first representative embodiment.

After the saw unit 4 has been pivoted past 45°, the pin 32 will not return to the extended position even if the operator releases the pulling force applied to the pin 32 via the knob 36. Thus, although the pin 32 returns toward the extended position, the pin 32 will resiliently abut the front surface of the joint plate 33 and will not move further. Therefore, the pin 32 will not interfere with the pivotal movement of the saw unit 4 past 45°. Moreover, the pin 32 also will not interfere with the pivotal movement of the saw unit 4 from a position past 45° to a position less than 45°. Rather, the pin 32 shrill automatically return to the extended position after the saw unit has been pivoted to a position less than 45°.

With regard to the maximum settable angle of the saw unit 4 in this representative embodiment, the length of the guide slot 12 is determined such that saw unit 4 can move between the 0° inclined position and the 50° inclined position, as described in connection with the first representative embodiment. Therefore, the saw unit 4 may not pivot past 50°. In this respect, the upper end of the guide slot 12 may serve as an engaging means for engaging the lock screw 14 to define the maximum settable inclined angle of 50°.

As described above, also in this second representative embodiment, the saw unit 4 can pivot from a position less than 45° to a position more than 45° without interruption at the 45° position if the pin 32 has previously been pulled. In addition, the saw unit 4 can pivot from a position more than 45° to a position less than 45° without interruption at the 45° position even if the pin 32 has been released.

In an alternative embodiment of this second representative embodiment, the pin 32 may have an engaging portion (not shown) that has a plurality of stepped portions arranged in series in the axial direction of the pin 32. The stepped portions may have lower ends at different levels from each other. With this arrangement, additional settable maximum inclined positions, such as 30° and 40° inclined positions, can be obtained in addition to the 45° and 50° inclined positions.

A third representative embodiment of a circular saw will now be described with reference to FIGS. 13 to 16. The third representative embodiment incorporates a lateral inclining device 40 that is different from the lateral inclining device 10 of the first embodiment in the mechanism for changing the maximum inclined position. In other respects, the third representative embodiment is the same as the first embodiment. Therefore, in the third representative embodiment, like members are given the same reference numerals as the first representative embodiment.

Similar to the first representative embodiment, the joint plate 13 with the projection 13*c* can vertically pivot relative to the guide plate 11 by means of the front pivotal support 5.

Preferably, a pair of guide rails 42 may be attached to the front surface of the guide plate 11. With the aid of the guide rails 42, a slide lever 41 may slide relative to the guide plate 11 in a direction parallel to the front surface of the guide plate 11. An engaging member or a pin 44 may be mounted on one end of the slide lever 41 and may extend through the slide lever 41. Further, a window 45 may be formed in the guide plate 11 at one end of the arc-shaped recess 11*a* and may serve to receive the pin 44, such that the pin 44 extends through the window 45 to the rear side of the guide plate 11. As a result, in response to the position of the slide lever 41, the pin 44 can move rightward and leftward as viewed in FIGS. 15 and 16 between an engaging position for engaging the projection 13*c* of the joint plate 13 and a disengaging position with the projection 13*c*.

A knob 43 may be mounted on the front end of the pin 44 that extends forward from the front surface of the slide lever 41, so that the operator can easily slide the slide lever 41 by grasping the knob 43.

Preferably, a part of the slide lever 41 in the middle portion may be cut and bent to form a claw 46 that enters the window 45. A compression spring 47 may be interposed between the claw 46 and a part 45*a* of the circumferential wall of the window 45 that opposes the claw 46. As a result, the slide lever 41 can be biased leftward as viewed in FIGS. 15 and 16. Thus, when the operator does not operate the slide lever 41, the pin 44 can be held in the engaging position, in which the rear end (lower end as viewed in FIG. 15) of the pin 44 opposes the projection 13*c* of the joint plate 13. Therefore, the projection 13*c* can contact the rear end of the joint plate 13 when the saw unit 4 has pivoted up to a 45° inclined position. As a result, the saw unit 4 cannot incline more than 45°.

Figure 16:
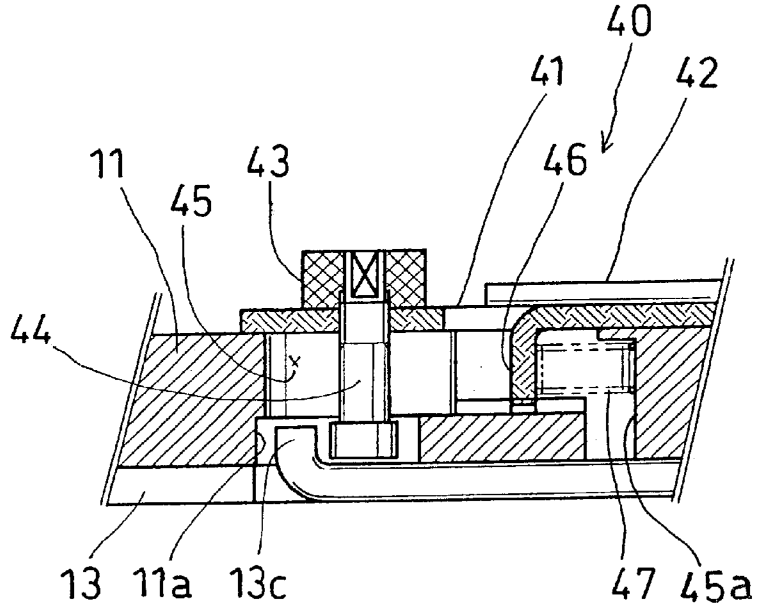
FIG. 16 is a sectional view taken along line (16)—(16) in FIG. 14.
Figure 17:
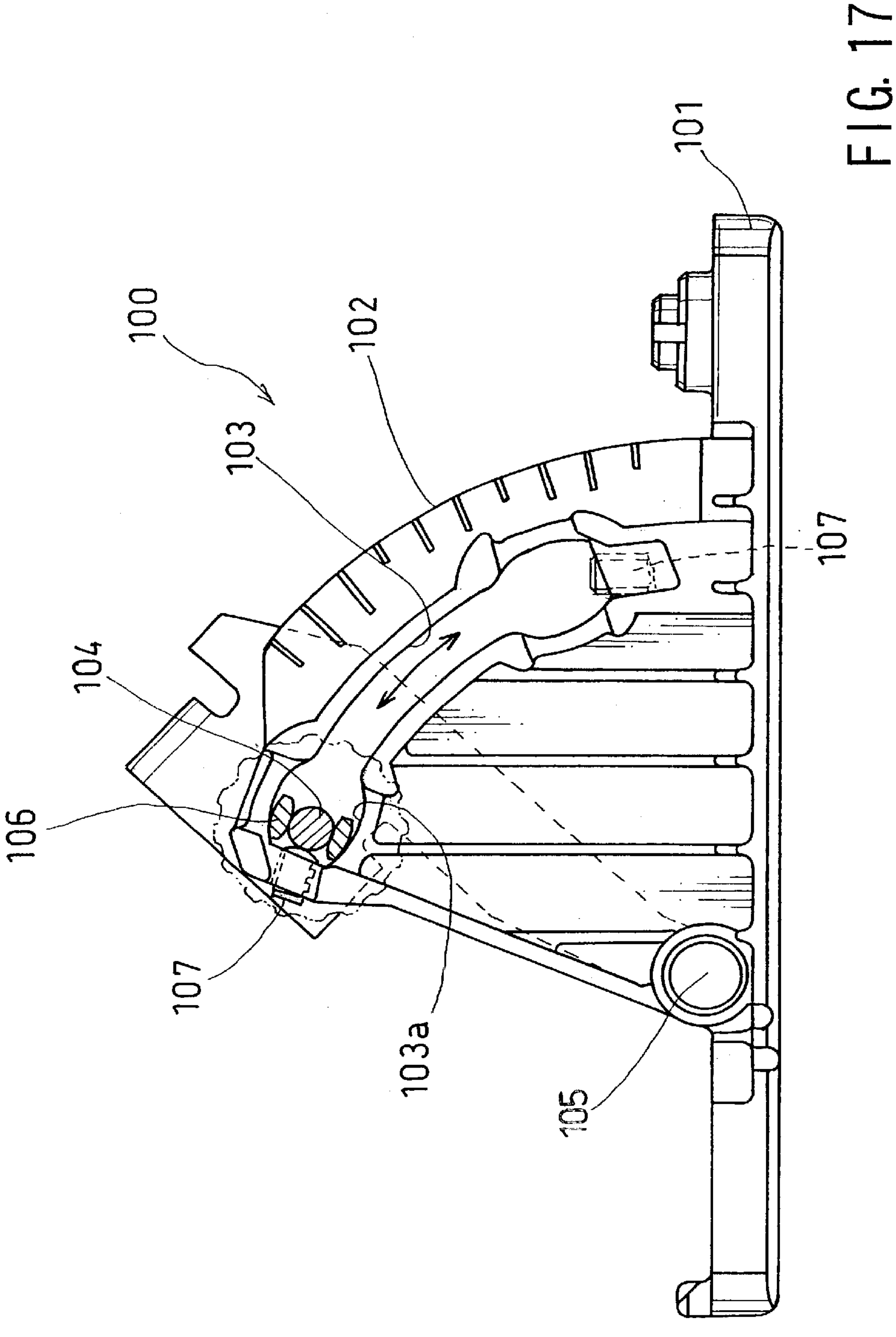
FIG. 17 PRIOR ART
FIG. 17 is a view of a laterally inclining device of a known saw unit.
Figure 18:
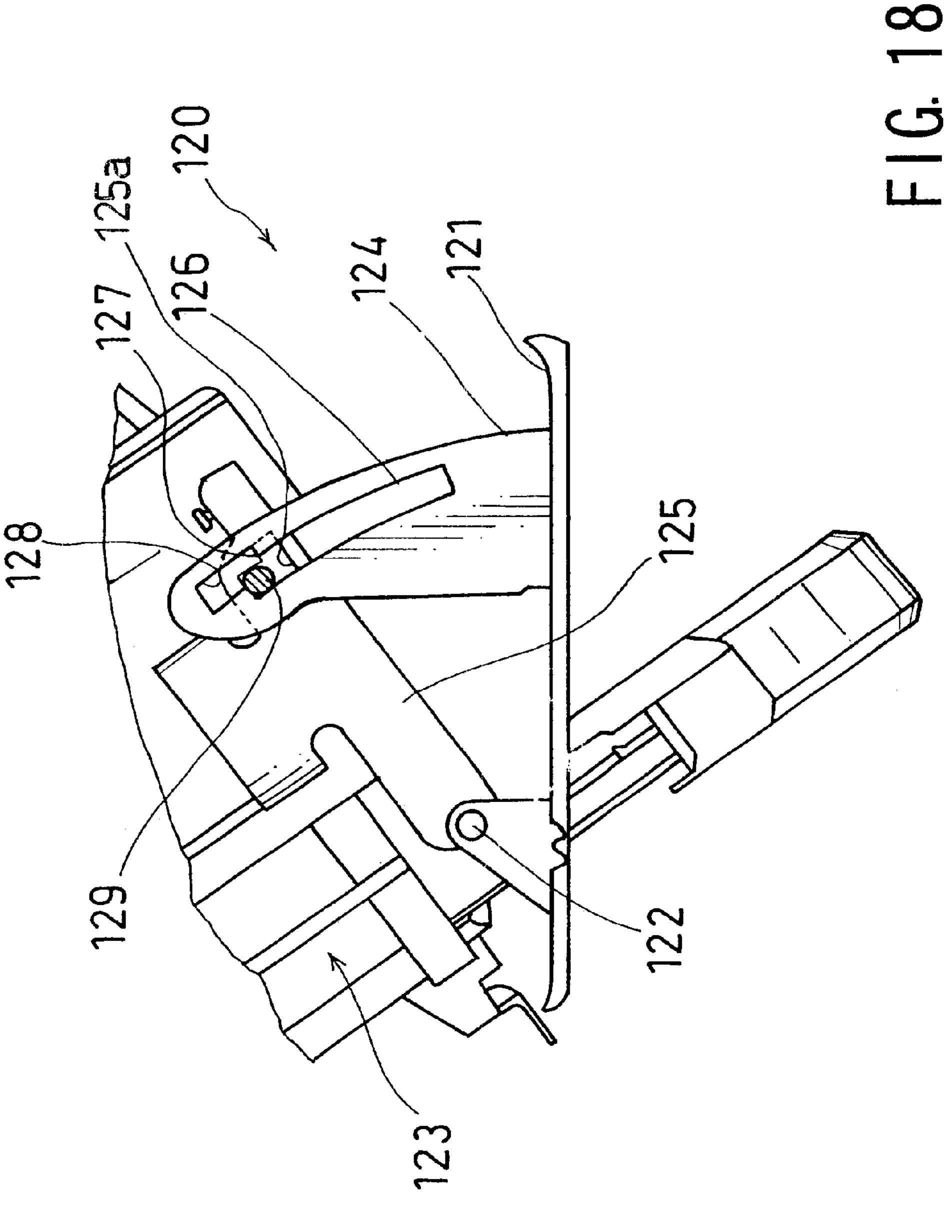
FIG. 18 PRIOR ART
FIG. 18 is a view of a laterally inclining device of another known saw unit.

On the other hand, when the operator pulls or pushes the knob 43 and moves the slide lever 41 rightward to the disengaging position as shown in FIG. 16, the pin 44 may not interfere with the pivotal movement of the projection 13*c*. Therefore, the saw unit 4 can incline more than 45°.

In this representative embodiment, the upper end of the guide slot 12 may serve as an engaging means for engaging the lock screw 14 to define the extra maximum inclined angle of 50° in the same manner as the second representative embodiment.

Also in this third representative embodiment, the saw unit 4 can pivot from a position less than 45° to a position more than 45° without interruption at the 45° position if the slide lever 41 has previously been pulled to move the pin 44 to the disengaging position. In addition, the saw unit 4 can pivot from a position more than 45l to a position less than 45° without interruption at the 45° position even if the slide lever 41 has been released. Thus, the front end of the pin 44 can resiliently abut the lower surface (right surface as viewed in FIGS. 15 and 16) of the projection 13*c* when the saw unit 4 has pivoted past 45°. Furthermore, the pin 44 can automatically return to the engaging position when the saw unit 4 has been pivoted from an inclined position more than 45° to an inclined position less than 45°.

Although in the above representative embodiments, the standard maximum inclination angle has been selected as 45°, it may be an angle other than 45°. In addition, although the extra maximum inclined angle has been selected as 50°, it may be greater than 50° or may be an angle between 46° to 49°.

What is claimed is:

1. A portable circular saw comprising:

a base arranged and constructed to contact a workpiece during a cutting operation, a saw unit coupled to the base and being laterally pi pivotable with respect to the base about a lateral pivotal axis, the saw unit comprising a circular saw blade, a guide plate fixedly secured to the base, wherein an arc-shaped guide slot is defined within the guide plate and the guide slot defines a maximum lateral pivotable range of the saw unit with respect to the base, a lock screw slidably disposed within the guide slot, wherein the lock screw is tightened in order to releasably fix the saw unit in position with respect to the base, the lock screw being coupled to the saw unit and pivotable together with the saw unit relative to the base, a first stopper coupled to the saw unit and being pivotable together with the saw unit relative to the base, the first stopper defining a first maximum laterally inclined angle of the saw unit relative to the base, and a pin movably mounted on the guide plate and being movable between at least a first position and a second position, wherein the first stopper contacts the pin when the pin is disposed in the first position, thereby limiting the maximum lateral pivotable range to the first maximum inclined angle and preventing the saw unit from being pivoted to a second maximum inclined angle, and when the pin is disposed in the second position, the saw unit is pivotable past the first maximum inclined angle to the second maximum inclined angle, wherein the second maximum inclined angle is greater than the first maximum inclined angle.

2. A portable circular saw as in claim 1, wherein the first maximum inclined angle is 45° and the second maximum inclined angle is between 46° and 50°.

3. A portable circular saw as in claim 1, further comprising means for finely adjusting the first maximum inclined angle.

4. A portable circular saw as in claim 3, wherein the means for finely adjusting the first maximum inclined angle comprises an operator-adjustable screw.

5. A portable circular saw as in claim 1, wherein a first end of the guide slot defines a second stopper and the lock screw contacts the second stopper at the second maximum inclined angle.

6. A portable circular saw as in claim 5, wherein when the pin is disposed in the first position, the pin prevents the lock screw from contacting the first end of the guide slot and when the pin is disposed in the second position, the pin does not contact the first stopper and so that the lock screw will contact the second stopper.

7. A portable circular saw as in claim 6, wherein the guide slot has a uniform width along the entire length of the guide slot.

8. A portable circular saw as in claim 6, wherein the second maximum inclined angle is 50°.

9. A portable circular saw as in claim 6, wherein the pin is linearly shiftable between the first position and the second position.

10. A portable circular saw as in claim 9, further comprising a spring biasing the pin towards the first position.

11. A portable circular saw as in claim 9, wherein the pin is linearly shiftable between the first position and the second position in a direction substantially parallel to the lateral pivotal axis.

12. A portable circular saw as in claim 9, wherein the pin is linearly shiftable between the first position and the second position in a direction substantially perpendicular to the lateral pivotal axis.

13. A portable circular saw as in claim 6, wherein the pin is rotatable about an axis substantially parallel to the lateral pivotal axis, the pin comprises a first surface and a second surface disposed opposite to the first surface and wherein the first surface opposes the first stopper when the pin is disposed in the first position and the second surface opposes the first stopper when the pin is disposed in the second position.

14. A portable circular saw as in claim 13, wherein the first surface is a substantially semi-circular surface and the second surface is a substantially flat surface.

15. A portable circular saw as in claim 14, further comprising means for retaining the pin in the respective first and second positions.

16. A portable circular saw as in claim 15, further comprising a dial connected to the pin and being arranged and constructed to rotate the pin between the first position and the second position.

17. A portable circular saw as in claim 16, further comprising means for retaining the pin in the respective first and second positions and wherein the first surface is a substantially semi-circular surface and the second surface is a substantially flat surface.

18. A portable circular saw comprising:

a base arranged and constructed to contact a workpiece during a cutting operation, a saw unit coupled to the base and being laterally pivotable with respect to the base about a lateral pivotal axis, the saw unit comprising a circular saw blade, means for releasably fixing a lateral inclined position of the saw unit relative to the base, means for switching between a first maximum inclined angle of the saw unit relative to the base and a second maximum inclined angle of the saw unit relative to the base, the second maximum inclined angle being greater than the first maximum inclined angle, and means for laterally pivoting the saw unit with respect to the base from an inclined angle less than the first maximum inclined angle to the second maximum inclined angle without stopping at the first maximum inclined angle when the switching means has been set to the second maximum inclined angle.

19. A portable circular saw comprising:

a base arranged and constructed to contact a workpiece during a cutting operation, a saw unit coupled to the base and being laterally pivotable with respect to the base about a lateral pivotal axis, the saw unit comprising a circular saw blade, a tightening device arranged and constructed to releasably fix a laterally inclined position of the saw unit with respect to the base, the tightening device being coupled to the saw unit and pivotable together with the saw unit relative to the base, a stopper coupled to the saw unit and being pivotable together with the saw unit relative to the base, the stopper defining a first maximum laterally inclined angle of the saw unit relative to the base, and an engaging mechanism movably coupled to the base and movable between at least a first position and a second position, wherein in the first position the engaging mechanism contacts the stopper and prevents the saw unit from being pivoted past the first maximum inclined angle to a second maximum inclined angle, and in the second position, the saw unit is freely pivotable past the first maximum inclined angle to the second maximum inclined angle without stopping at the first maximum inclined angle, wherein the second maximum inclined angle is greater than the first maximum inclined angle.

20. A portable circular saw as in claim 19, wherein the tightening device includes:

a guide plate coupled to the base, a guide slot having a uniform width defined within the guide plate, and a lock screw slidably disposed within the guide plate, wherein in the second position of the engaging mechanism, the lock screw contacts a first end of a guide slot at the second maximum inclined angle.

21. A portable circular saw comprising:

a base arranged and constructed to contact a workpiece during a cutting operation, a saw unit coupled to the base and being laterally pivotable with respect to the base about a lateral pivotal axis, the saw unit comprising a circular saw blade, a guide plate fixedly secured to the base, wherein an arc-shaped guide slot having a uniform width is defined within the guide plate and the guide slot defines a maximum lateral pivotable range of the saw unit with respect to the base, a first stopper coupled to the saw unit and being pivotable together with the saw unit relative to the base, the first stopper defining a first maximum laterally inclined angle of the saw unit relative to the base, a lock screw slidably disposed within the guide slot, wherein the lock screw is arranged and constructed to releasably fix a laterally inclined position of the saw unit with respect to the base, the lock screw being coupled to the saw unit and being pivotable together with the saw unit relative to the base, and wherein one end of the guide slot defines a second stopper, the second stopper defining a second maximum laterally inclined angle of the saw unit relative to the base, the second maximum inclined angle being greater than the first maximum inclined angle, and a pin movably mounted on the guide plate and being movable between at least a first position and a second position, wherein the first stopper contacts the pin when the pin is disposed in the first position, thereby limiting the maximum lateral pivotable range to the first maximum inclined angle and preventing the saw unit from being pivoted to the second maximum inclined angle, and when the pin is disposed in the second position, the saw unit is pivotable past the first maximum inclined angle to the second maximum inclined angle, whereat the second stopper contacts the lock screw.

* * * * *